United States Patent
Suzuki et al.

(10) Patent No.: US 12,429,095 B2
(45) Date of Patent: Sep. 30, 2025

(54) PLUNGING-TYPE CONSTANT VELOCITY UNIVERSAL JOINT

(71) Applicant: NTN CORPORATION, Osaka (JP)

(72) Inventors: Daiki Suzuki, Shizuoka (JP); Tatsuro Sugiyama, Shizuoka (JP); Masazumi Kobayashi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/873,481

(22) PCT Filed: May 22, 2023

(86) PCT No.: PCT/JP2023/018969
§ 371 (c)(1),
(2) Date: Dec. 10, 2024

(87) PCT Pub. No.: WO2023/243319
PCT Pub. Date: Dec. 21, 2023

(65) Prior Publication Data
US 2025/0163971 A1    May 22, 2025

(30) Foreign Application Priority Data
Jun. 16, 2022 (JP) ................................. 2022-097480

(51) Int. Cl.
*F16D 3/227* (2006.01)
*F16D 3/223* (2011.01)

(52) U.S. Cl.
CPC .... *F16D 3/227* (2013.01); *F16D 2003/22303* (2013.01); *F16D 2003/22309* (2013.01); *Y10S 464/906* (2013.01)

(58) Field of Classification Search
CPC ........... F16D 3/227; F16D 2003/22303; F16D 2003/22309; Y10S 464/906
(Continued)

(56) References Cited

U.S. PATENT DOCUMENTS 7,632,190 B2 * 12/2009 Nakao ................. F16D 3/224
464/145
11,359,677 B2 * 6/2022 Kobayashi ............ F16D 3/2245
(Continued)

FOREIGN PATENT DOCUMENTS

CN   1644946   7/2005
CN   1910380   2/2007
(Continued)

OTHER PUBLICATIONS

Universal Joint and Driveshaft Design Manual, AE-7, Society of Automotive Engineers, Inc., Warrendale,PA, Section 3.2.13, pp. 167-170, TJ1079.S62. (Year: 1979).*
(Continued)

*Primary Examiner* — Greg Binda
(74) *Attorney, Agent, or Firm* — Wenderoth, Lind & Ponack, L.L.P.

(57) ABSTRACT

A plunging-type constant velocity universal joint includes outer and inner joint members having linear track grooves, balls, and a cage accommodating the balls in pockets. Curvature centers of spherical outer and inner peripheral surfaces of the cage are offset toward opposite sides with respect to a joint center. A range between distances of 10 mm towards deep and opening sides from a center portion of a sliding range of the track groove of the outer member in the axial direction is a center range, and a region in which a PCD of the track grooves of the outer member becomes smallest is in the center range. A minimum value of a PCD clearance in the track grooves in the center range is from 0.010 mm to 0.100 mm. A PCD mutual difference of the track grooves of the outer member in the center range is 0.150 mm or less.

5 Claims, 13 Drawing Sheets

(58) Field of Classification Search
USPC .......................................................... 464/146
See application file for complete search history.

(56) References Cited

U.S. PATENT DOCUMENTS

| | | |
|---|---|---|
| 2005/0148397 A1 | 7/2005 | Nakagawa et al. |
| 2005/0170898 A1 | 8/2005 | Mochinaga et al. |
| 2005/0261066 A1 | 11/2005 | Nakagawa et al. |
| 2009/0136287 A1 | 5/2009 | Kobayashi et al. |
| 2009/0317177 A1 | 12/2009 | Nakagawa et al. |

FOREIGN PATENT DOCUMENTS

| | | |
|---|---|---|
| CN | 101096980 | 1/2008 |
| CN | 100507300 | 7/2009 |
| CN | 110431324 | 11/2019 |
| CN | 220227581 | 12/2023 |
| JP | 10-73129 | 3/1998 |
| JP | 2005-337290 | 12/2005 |
| JP | 2007-85488 | 4/2007 |
| JP | 2008-2544 | 1/2008 |
| JP | 2008-256022 | 10/2008 |
| JP | 2008-298268 | 12/2008 |
| JP | 2010-19275 | 1/2010 |
| JP | 2011-58639 | 3/2011 |
| JP | 2011-247360 | 12/2011 |
| JP | 2018-35896 | 3/2018 |

OTHER PUBLICATIONS

International Search Report (ISR) issued Aug. 1, 2023 in International (PCT) Application No. PCT/JP2023/018969.

\* cited by examiner

PLUNGING-TYPE CONSTANT VELOCITY UNIVERSAL JOINT

TECHNICAL FIELD

The present invention relates to a plunging-type constant velocity universal joint to be used in power transmission systems such as automobiles and various industrial machines, for example, a drive shaft or a propeller shaft for an automobile.

BACKGROUND ART

Constant velocity universal joints to be applied to a drive shaft of an automobile are roughly classified into a fixed type constant velocity universal joint that allows only angular displacement between two axes, and a plunging-type constant velocity universal joint that allows both the angular displacement and axial displacement. With regard to a drive shaft for an automobile, typically, a fixed type constant velocity universal joint is used on a drive wheel side (also referred to as "out-board side"), and a plunging-type constant velocity universal joint is used on a differential side (also referred to as "in-board side"). The two constant velocity universal joints are coupled to each other through intermediation of an intermediate shaft. Constant velocity universal joints are selected depending on use conditions, applications, and the like.

As the plunging-type constant velocity universal joint, a double-offset constant velocity universal joint (DOJ) and a tripod type constant velocity universal joint (TJ) are representatively given. The plunging-type constant velocity universal joint of DOJ type has been widely used because of its low manufacturing cost and small rotational backlash in the joint. As the plunging-type constant velocity universal joint of DOJ type, the one including six balls and the one including eight balls have been known. In Patent Literature 1, a DOJ with a compact design including eight balls is described, and in Patent Literature 2, a DOJ with a maximum operating angle of 30° or more in which an increase in operating angle and a reduction in weight and size are attained is described.

The plunging-type constant velocity universal joint of DOJ type includes: an outer joint member including a cylindrical inner peripheral surface having a plurality of linear track grooves extending along an axial direction; an inner joint member including a spherical outer peripheral surface having a plurality of linear track grooves which are opposed to the plurality of linear track grooves of the outer joint member, and extend along the axial direction; a plurality of torque transmission balls incorporated between the plurality of linear track grooves of the outer joint member and the plurality of linear track grooves of the inner joint member; and a cage, which accommodates the torque transmission balls in pockets, and includes a spherical outer peripheral surface and a spherical inner peripheral surface, which are guided in contact with the cylindrical inner peripheral surface of the outer joint member and the spherical outer peripheral surface of the inner joint member, respectively. The plunging-type constant velocity universal joint of DOJ type has a configuration in which a curvature center of the spherical outer peripheral surface of the cage and a curvature center of the spherical inner peripheral surface of the cage are offset toward opposite sides in the axial direction with respect to a joint center.

PRIOR ART DOCUMENTS

Patent Documents

Patent Document 1: JP 10-73129 A
Patent Document 2: JP 2007-85488 A

SUMMARY OF THE INVENTION

Problems to be Solved by the Invention

In the plunging-type constant velocity universal joint of DOJ type, for the purpose of achieving low manufacturing cost, in general, an inside of a cup section of the outer joint member and the track grooves of the inner joint member are finished by cold forging, and finishing such as grinding is not performed on the inside of the cup section and the track grooves of the inner joint member after heat treatment. Accordingly, due to, in addition to an influence of accuracy of cold forging, heat treatment deformation caused by heat treatment on the track grooves, pitch circle diameters PCD of the track grooves of the outer joint member and the inner joint member vary between the track grooves. The pitch circle diameter PCD of the track grooves (hereinafter also referred to simply as "PCD") is a distance between centers of the balls on a joint diameter at the time when the torque transmission balls are pressed against the track grooves. There is a difference between a maximum value and a minimum value of the PCDs between the track grooves. This difference between the maximum value and the minimum value of the PCDs between the track grooves refers to a PCD mutual difference.

The PCD mutual difference affects variations in PCD clearance that is a track clearance between the track grooves and the ball. That is, the PCD mutual difference affects a difference between a maximum value and a minimum value of the PCD clearance between the track grooves. This difference between the maximum value and the minimum value of the PCD clearance between the track grooves also refers to a mutual difference in PCD clearance.

When the mutual difference in PCD clearance is excessively large, a load may not be borne evenly between the track grooves under torque load. As a result, the load is intensively borne between certain track grooves, and hence there is a fear in that durability, strength, and NVH characteristics are deteriorated.

Further, in a process, it is typical to selectively combine an inner joint member according to PCD dimensions of track grooves of an outer joint member in order to secure a proper PCD clearance. It is important to enable efficient practical use of this selective combination in terms of productivity and manufacturing cost.

In view of the above-mentioned problem, the present invention has an object to provide a double-offset plunging-type constant velocity universal joint that enables practical use of selective combination of inner joint members for PCD dimensions of track grooves of outer joint members based on practical accuracy level of forging and heat treatment, and can secure durability, strength, and NVH characteristics.

Solutions to the Problems

In order to achieve the above-mentioned object, the inventors of the present invention have extensively studied multifaceted items: (a) accuracy at the limit of forging and heat treatment; (b) possibility of efficient practical use of selective combination of inner joint members for PCD dimensions of track grooves; and (c) securing durability, strength, and NVH characteristics (vibration characteristics). As a result, the inventors of the present invention have reached the conclusion that the key to the solution is to focus on circumferential backlash in a center range of the track groove in the axial direction of the joint, which is a sliding range most frequently used in actual vehicles including double-offset plunging-type constant velocity universal joints mounted thereto. The present invention has been attained by a new idea of setting a minimum value of a PCD clearance and a PCD mutual difference in the center range.

As a technical measure for achieving the above-mentioned object, according to the present invention, there is provided a plunging-type constant velocity universal joint, comprising: an outer joint member comprising a cylindrical inner peripheral surface having a plurality of linear track grooves extending along an axial direction; an inner joint member comprising a spherical outer peripheral surface having a plurality of linear track grooves which are opposed to the plurality of linear track grooves of the outer joint member, and extend along the axial direction; a plurality of torque transmission balls incorporated between the plurality of linear track grooves of the outer joint member and the plurality of linear track grooves of the inner joint member; and a cage, which is configured to accommodate the torque transmission balls in pockets, and comprises a spherical outer peripheral surface and a spherical inner peripheral surface, which are guided in contact with the cylindrical inner peripheral surface of the outer joint member and the spherical outer peripheral surface of the inner joint member, respectively, a curvature center of the spherical outer peripheral surface of the cage and a curvature center of the spherical inner peripheral surface of the cage being offset toward opposite sides in the axial direction with respect to a joint center. A range between a distance of 10 mm toward a deep side and a distance of 10 mm toward an opening side from a center portion of a sliding range of the track groove of the outer joint member in the axial direction of the joint is defined as a center range, and a region in which a PCD of the track grooves of the outer joint member becomes smallest is formed in the center range. A minimum value of a PCD clearance in the track grooves in the center range is set to from 0.010 mm to 0.100 mm. A PCD mutual difference of the track grooves of the outer joint member in the center range is set to 0.150 mm or less. With the above-mentioned configuration, it is possible to achieve a double-offset plunging-type constant velocity universal joint that enables practical use of selective combination of inner joint members for PCD dimensions of track grooves of outer joint members based on practical accuracy level of forging and heat treatment, and can secure durability, strength, and NVH characteristics.

Specifically, the PCD mutual difference in a region of each of the track grooves of the outer joint member excluding the above-mentioned center range is set to 0.170 mm or less. Thus, for example, when the joint is assembled to a vehicle, or when the vehicle has been pushed up due to road surface conditions during travel, the balls can slide smoothly in the track grooves without unnecessary interference.

The track grooves are each a surface formed by plastic working, thereby being capable of achieving low manufacturing cost.

The torque transmission ball is held in angular contact with each of the track groove of the outer joint member and the track groove of the inner joint member, thereby being capable of reliably suppressing the circumferential backlash.

The number of the plurality of torque transmission balls is set within a range of from six to eight. Thus, a double-offset plunging-type constant velocity universal joint suitable for power transmission systems such as automobiles and various industrial machines can be configured.

Effects of the Invention

According to the present invention, it is possible to achieve the double-offset plunging-type constant velocity universal joint that enables the practical use of the selective combination of the inner joint members for the PCD dimensions of the track grooves of the outer joint members based on the practical accuracy level of forging and heat treatment, and can secure durability, strength, and NVH characteristics.

According to the present invention, the circumferential backlash can be suppressed, and NVH characteristics can be secured. Thus, it is possible to achieve the double-offset plunging-type constant velocity universal joint that is more suitable for motor-driven electric vehicles, which particularly require improved transmission responsiveness of rotational torque and improved quietness.

EMBODIMENTS OF THE INVENTION

Figure 1:
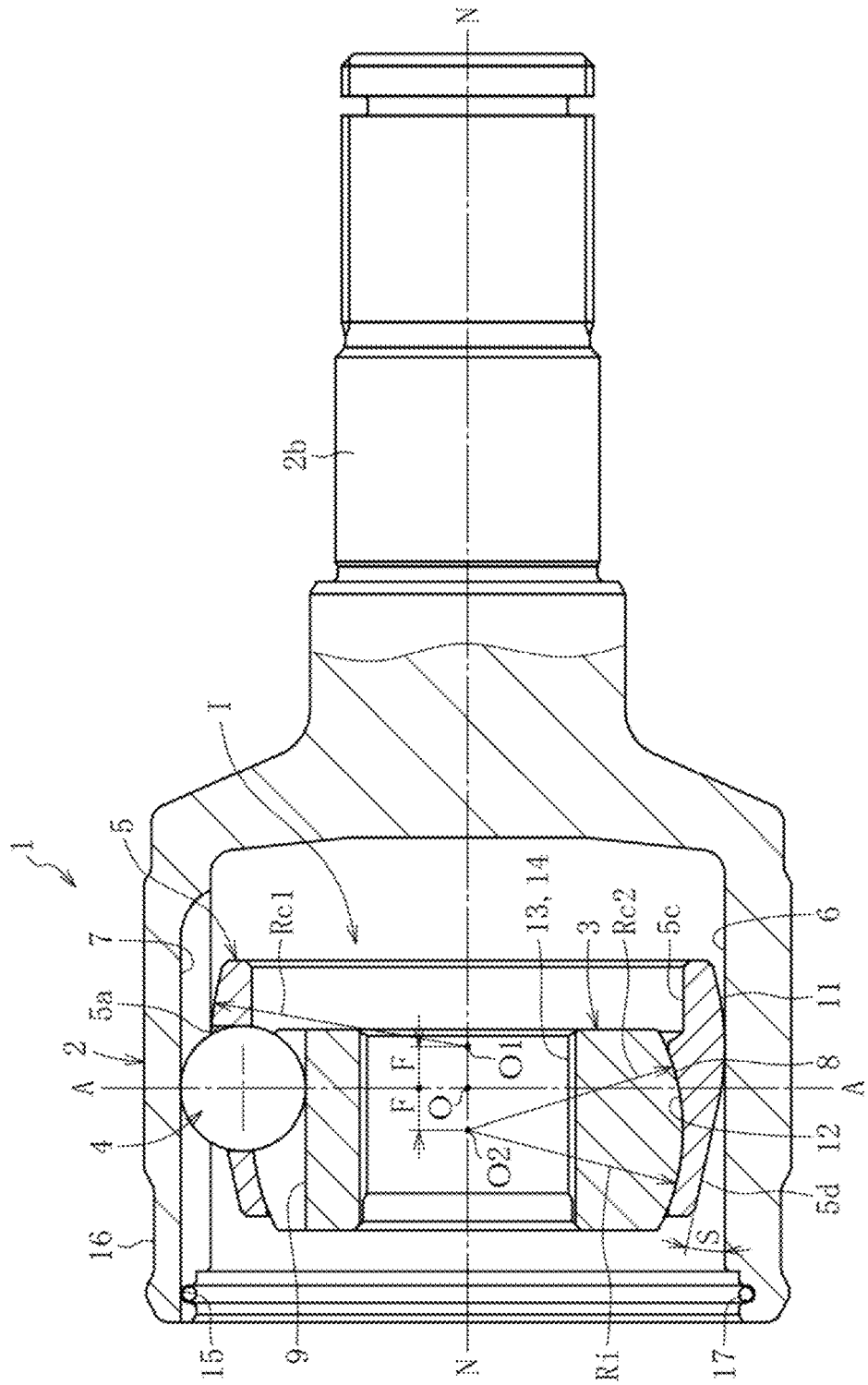
FIG. 1 is a longitudinal sectional view of a plunging-type constant velocity universal joint according to a first embodiment of the present invention, and is a longitudinal sectional view taken along the line B-N-B of FIG. 2.
Figure 2:
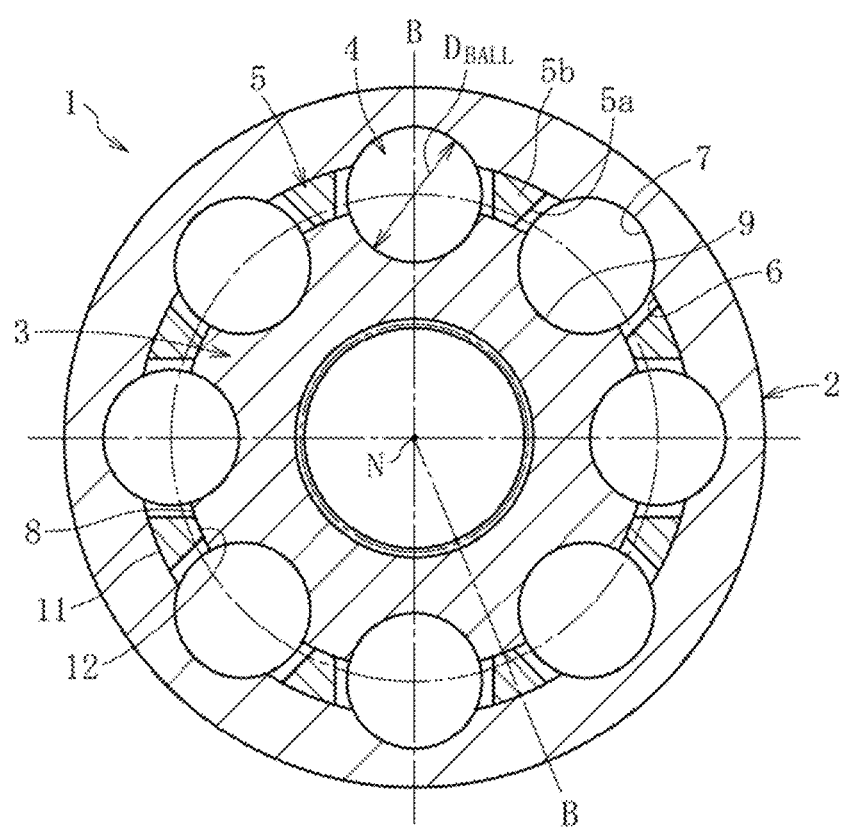
FIG. 2 is a transverse sectional view of the plunging-type constant velocity universal joint according to the first embodiment of the present invention, and is a transverse sectional view taken along the line A-A of FIG. 1.
Figure 3:
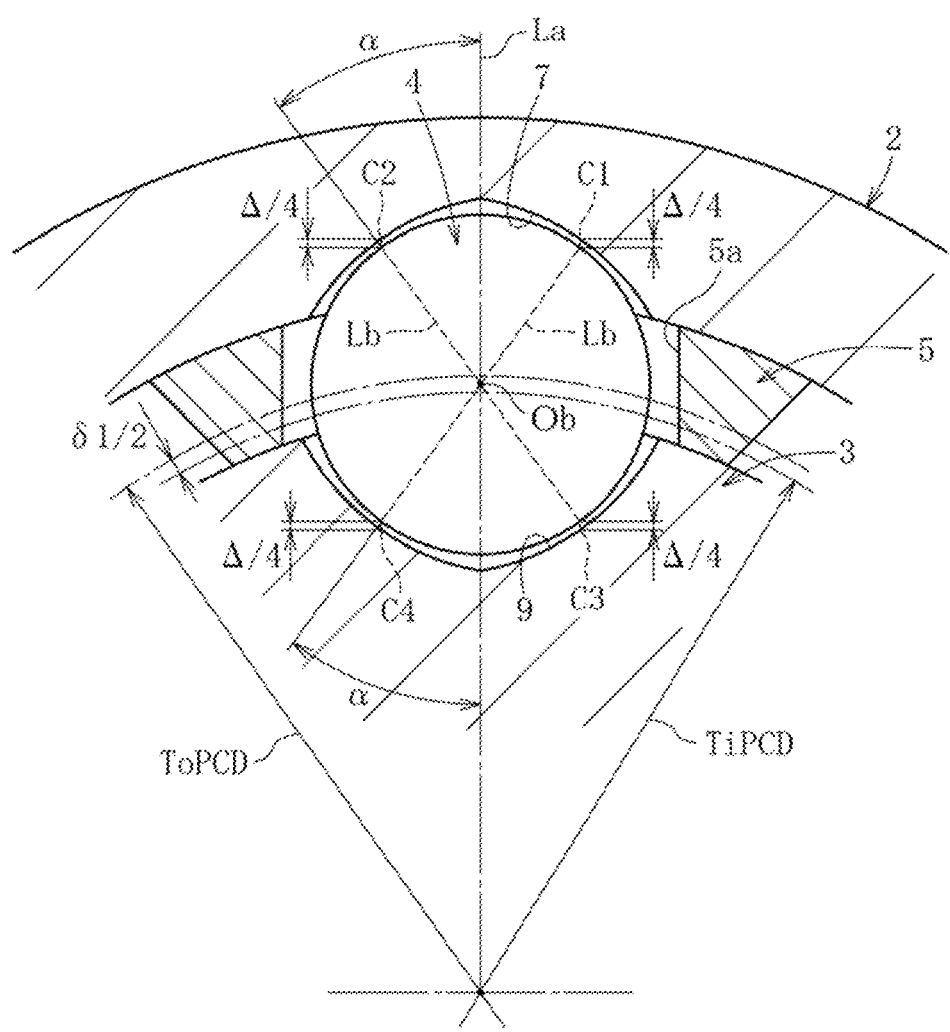
FIG. 3 is a transverse sectional view taken along the line B-N of FIG. 2, for illustrating one of the track grooves of the outer joint member and one of the track grooves of the inner joint member, a torque transmission ball, and a cage in an enlarged manner.

A double-offset plunging-type constant velocity universal joint according to a first embodiment of the present invention is described with reference to FIG. 1 to FIG. 11. FIG. 1 is a longitudinal sectional view of a plunging-type constant velocity universal joint according to this embodiment, and is a longitudinal sectional view taken along the line B-N-B of FIG. 2. FIG. 2 is a transverse sectional view of the plunging-type constant velocity universal joint according to this embodiment, and is a transverse sectional view taken along the line A-A of FIG. 1. FIG. 3 is a transverse sectional view taken along the line B-N of FIG. 2, for illustrating one track groove, a torque transmission ball, and a cage in an enlarged manner.

As illustrated in FIG. 1 and FIG. 2, a plunging-type constant velocity universal joint 1 is a so-called double-offset plunging-type constant velocity universal joint (sometimes abbreviated as "DOJ"), and mainly comprises an outer joint member 2, an inner joint member 3, torque transmission balls 4, and a cage 5. A cylindrical inner peripheral surface 6 of the outer joint member 2 has eight track grooves 7. The track grooves 7 are formed at equal intervals in a circumferential direction and linearly extend along an axial direction. A spherical outer peripheral surface 8 of the inner joint member 3 has track grooves 9 which are opposed to the track grooves 7 of the outer joint member 2. The track grooves 9 are formed at equal intervals in a circumferential direction and linearly extend along the axial direction. The track grooves 7, 9 are each a surface formed by plastic working. Eight torque transmission balls (hereinafter simply referred to also as "balls") 4 are individually incorporated between the track grooves 7 of the outer joint member 2 and the track grooves 9 of the inner joint member 3. The balls 4 are received in pockets 5a of the cage 5.

The cage 5 comprises a spherical outer peripheral surface 11 and a spherical inner peripheral surface 12. The spherical outer peripheral surface 11 is fitted to and guided in contact with the cylindrical inner peripheral surface 6 of the outer joint member 2. The spherical inner peripheral surface 12 is fitted to and guided in contact with the spherical outer peripheral surface 8 of the inner joint member 3. The spherical outer peripheral surface 11 of the cage 5 is formed to have a curvature radius Rc1 about a curvature center represented by O1, and the spherical inner peripheral surface 12 is formed to have a curvature radius Rc2 about a curvature center represented by O2. The spherical outer peripheral surface 8 of the inner joint member 3 is formed to have a curvature radius Ri about the curvature center represented by O2. The curvature centers O1 and O2 are located on an axis N, and are offset by equal distances F toward opposite sides in the axial direction with respect to a joint center O. With this configuration, when the joint forms an operating angle, the balls 4 are always guided on a plane bisecting an angle formed by both axes of the outer joint member 2 and the inner joint member 3, thereby achieving transmission between two shafts with constant-velocity rotation.

A stop ring groove 15 is provided at an opening-side end portion of the outer joint member 2, and a stop ring 17 is mounted to the stop ring groove 15, thereby preventing an inner assembly I illustrated in FIG. 1 comprising the inner joint member 3, the balls 4, and the cage 5 from moving out from the opening-side end portion of the outer joint member 2. The opening-side end portion of the outer joint member 2 has, on an outer periphery thereof, a boot mounting groove 16. A stem portion (shaft portion) 2b is integrally formed on a counter-opening side of the outer joint member 2, and is coupled to a differential (not shown).

The spherical outer peripheral surface 8 of the inner joint member 3 has the linear track grooves 9, and hence a groove depth of each of the track grooves 9 becomes smaller as extending from a center of the inner joint member 3 in the axial direction toward both ends. Aspline (including serration, which similarly applies to the following description) 14 is formed on a coupling hole 13 of the inner joint member 3. A shaft end portion of an intermediate shaft (not shown) is spline-fitted to the coupling hole 13, and is fixed to the inner joint member 3 by a shoulder portion of the intermediate shaft and the stop ring (not shown) in the axial direction.

Eight pockets 5a are formed on the axial center of the cage 5 indicated by the line A-A of FIG. 1 at equal intervals in a circumferential direction, and pillar portions 5b (see FIG. 2) are each provided between adjacent pockets 5a. A cutout 5c for receiving the inner joint member 3 to be incorporated therein is formed along an inner periphery of a large-diameter-side end portion of the cage 5. A stopper surface 5d of the cage 5 has a conical shape so that the stopper surface 5d is tangentially connected to the spherical outer peripheral surface 11. In the plunging-type constant velocity universal joint 1 of this embodiment, the maximum operating angle is set to, for example, 25°. When the joint forms an operating angle, the cage 5 is inclined at half an angle formed by both axes of the outer joint member 2 and the inner joint member 3. Thus, an inclination angle S of the stopper surface 5d is set to 12.5°. With this configuration, the maximum allowable angle of the plunging-type constant velocity universal joint 1 can be restricted.

With reference to FIG. 3, angular contact between each of the track groove 7 of the outer joint member 2 and the track groove 9 of the inner joint member 3 and the torque transmission ball 4, PCDs of the track grooves 7 and 9, and a PCD clearance in the track grooves 7 and 9 are described. FIG. 3 shows one track groove 7, one track groove 9, and one torque transmission ball 4, and the cage 5 taken along the line B-N of FIG. 2. The transverse cross sections of the track groove 7 of the outer joint member 2 and the transverse section of the track groove 9 of the inner joint member 3 are each formed into a gothic arch shape which is formed by a combination of two arcs. Therefore, the ball 4 is held in angular contact with the track groove 7 at two points C1 and C2 and with the track groove 9 at two points C3 and C4. The transverse cross sectional shape of each of the track grooves 7 and 9 is not limited to the gothic arch shape described above, and may be an elliptical shape.

As illustrated in FIG. 3, when a pitch circle diameter of the track grooves 7 of the outer joint member 2 and a pitch circle diameter of the track grooves 9 of the inner joint member 3 are represented so as to be distinguished from each other, the pitch circle diameter of the track grooves 7 of the outer joint member 2 is represented by ToPCD, and the pitch circle diameter of the track grooves 9 of the inner joint member 3 is represented by TiPCD. ToPCD is set larger than TiPCD by, for example, about 0.050 mm at a median value. As a result, a center Ob of the torque transmission ball 4 is located at a radially intermediate position between ToPCD and TiPCD, and under a no-load state, a track clearance is formed in a track contact angle α direction between the ball 4 and each of the track groove 7 of the outer joint member 2 and the track groove 9 of the inner joint member 3. A radial clearance component based on the track clearance in the track contact angle α direction is a PCD clearance Δ. In other words, the PCD clearance Δ is expressed by the following equation.

PCD clearance Δ=ToPCD−TiPCD

As used herein and in claims, the PCD clearance has the above-mentioned meaning.

A diameter $D_{BALL}$ of the ball 4 (see FIG. 2) is a reference diameter (constant dimension), and hence the PCD clearance Δ fluctuates when the pitch circle diameter ToPCD of the track grooves 7 of the outer joint member 2 and the pitch circle diameter TiPCD of the track grooves 9 of the inner joint member 3 vary due to forging accuracy and heat treatment deformation. Specifically, when the pitch circle diameter ToPCD of the track grooves 7 of the outer joint member 2 becomes larger, and the pitch circle diameter TiPCD of the track grooves 9 of the inner joint member 3 becomes smaller, the PCD clearance Δ becomes larger. Conversely, when ToPCD becomes smaller, and TiPCD becomes larger, the PCD clearance Δ becomes smaller.

Based on the PCD clearance Δ, circumferential backlash occurs. In the plunging-type constant velocity universal joint 1 according to this embodiment, the transverse sectional shape of each of the track grooves 7 and 9 is formed into a gothic arch shape. Thus, a rotational backlash amount inside the joint can be reliably suppressed, and torque load responsiveness in EVs is excellent. In FIG. 3, a dimensional difference between TiPCD and ToPCD and the PCD clearance Δ are illustrated in an exaggerated manner.

The track contact angle α is an angle α between a straight line La and a straight line Lb in FIG. 3. The straight line La is a center line of each of the transverse cross sections of the track grooves 7 and 9, and corresponds to the line B-N of FIG. 2. The straight line Lb is a straight line connecting each of contact points C1, C2, C3, and C4 of the ball 4 on side surfaces of the track grooves 7 and 9 to a center Ob of the ball 4.

As the plunging-type constant velocity universal joint 1 according to this embodiment, the joint in which the ball 4 is held in angular contact with the track grooves 7 and 9 is given as an example, but the configuration is not limited to angular contact. The transverse sectional shapes of the track groove 7 of the outer joint member 2 and the track groove 9 of the inner joint member 3 may each be a circular arc shape, and the ball 4 may be held in circular contact with each of the track grooves 7 and 9 at a single point.

The overall configuration of the double-offset plunging-type constant velocity universal joint 1 according to this embodiment is as described above. Next, characteristic configurations are described. The characteristic configurations are as described in the following items (1) to (3).

(1) A range between a distance of 10 mm toward a deep side and a distance of 10 mm toward an opening side from a center portion of a sliding range of the track groove of the outer joint member in an axial direction of the joint is defined as a center range, and a region in which the PCD of the track grooves of the outer joint member becomes smallest is formed in the center range.

(2) A minimum value of the PCD clearance Δ in the track grooves in the center range is set to from 0.010 mm to 0.100 mm.

(3) A PCD mutual difference of the track grooves of the outer joint member in the center range is set to 0.150 mm or less.

The above-mentioned characteristic configurations (1) to (3) have been attained through the following study process. That is, as a result of extensive studies of the following multifaceted items by the inventors of the present invention: (a) accuracy level at the limit of forging and heat treatment; (b) possibility of efficient practical use of selective combination of inner joint members for PCD dimensions of track grooves; and (c) securing durability, strength, and NVH characteristics (low vibration characteristics), the inventors of the present invention have arrived at the conclusion that the key to the solution is to focus on the circumferential backlash in the center range of the track groove of the outer joint member in the axial direction of the joint, which is the sliding range most frequently used in actual vehicles including double-offset plunging-type constant velocity universal joints mounted thereto. The above-mentioned characteristic configurations (1) to (3) have been attained by a new idea of setting the minimum value of the PCD clearance Δ and the PCD mutual difference of the track grooves of the outer joint member in the center range.

Figure 4:
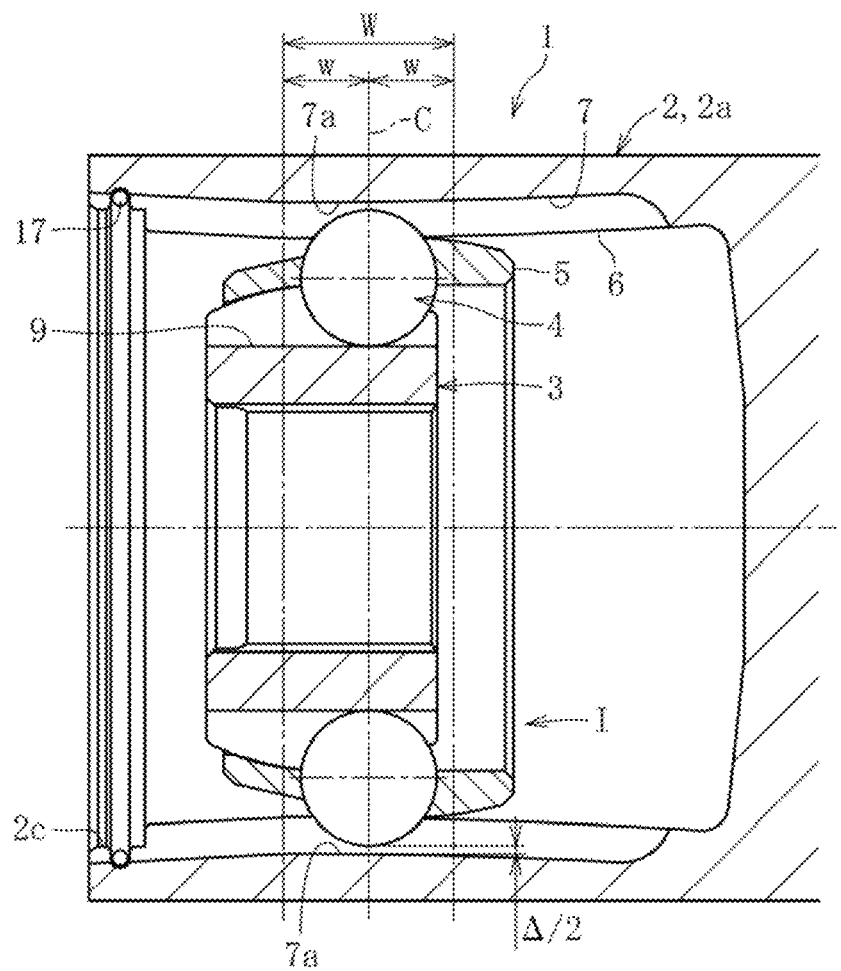
FIG. 4 is a longitudinal sectional view for illustrating a center portion of a sliding range of FIG. 1.
Figure 5:
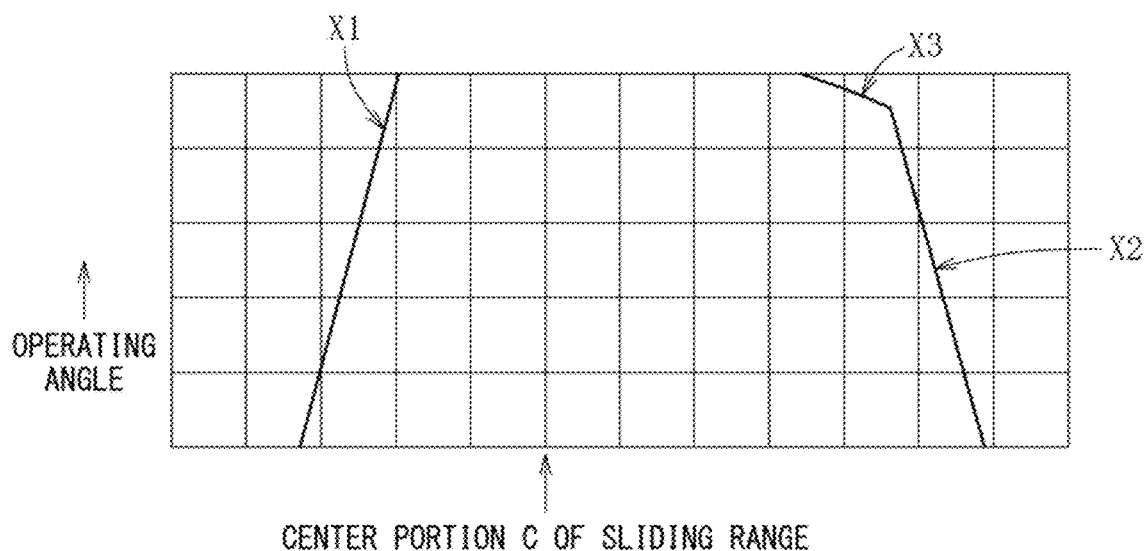
FIG. 5 is an explanatory schematic graph for showing the center portion of the sliding range of FIG. 4.

With reference to the drawings, the characteristic configurations are described in order. The characteristic configuration (1) is obtained in such a manner that a region in which the PCD of the track grooves of the outer joint member becomes smallest is formed in the center range in order to accurately form the PCD clearance Δ in the center range of the track groove of the outer joint member in the axial direction of the joint, which is the sliding range most frequently used in actual vehicles including double-offset plunging-type constant velocity universal joints mounted thereto. The characteristic configuration (1) is specifically described with reference to FIG. 4 and FIG. 5. FIG. 4 is a view for illustrating details of the track grooves of the outer joint member of FIG. 1 in the axial direction of the joint, and is a longitudinal sectional view for illustrating the center portion of the sliding range. FIG. 5 is an explanatory schematic graph for showing the center portion of the sliding range of FIG. 4.

In general, the outer joint member 2 of the double-offset plunging-type constant velocity universal joint 1 is manufactured by a forging step, a cutting step, a quenching step, and a grinding step, and an inside of a cup section is finished by cold forging (finishing such as the grinding step after the quenching step is not performed). Further, in general, the inner joint member 3 is manufactured by a forging step, a cutting step, a heat treatment step, and a grinding step, and the track grooves 9 are finished by cold forging (finishing such as the grinding step after the quenching step is not performed). As illustrated in FIG. 4, using a center portion C (also a set position) of the sliding range of the track groove 7 of the outer joint member 2 in the axial direction of the joint as a basis, a range between a distance of "w" (=10 mm) toward the deep side and a distance of "w" (=10 mm) toward the opening side from the center portion C of the sliding range is defined as a center range W. As illustrated in FIG. 4, in the forging step and the heat treatment step, a region 7a in which the PCD of each of all the track grooves 7 of the outer joint member 2 becomes smallest is formed in the center range W. Here, the phrase "a region in which each of the PCDs of the track grooves of the outer joint member becomes smallest is formed in the center range W" as used herein and in claims means that a region in which the PCD becomes smallest is formed for each of all the track grooves of the outer joint member. The region 7a, which is formed in the center range W and in which the PCD (ToPCD, see FIG. 3) of the track grooves 7 becomes smallest, is used as the basis for setting the PCD clearance Δ in the track grooves 7 and 9 and the PCD of the track grooves 7 of the outer joint member 2, which are described later.

In FIG. 4, in order to facilitate understanding of the region 7a which is formed in the center range W and in which the PCD (ToPCD) of the track grooves 7 becomes smallest, the PCD clearance Δ is illustrated between a groove bottom of each of the track grooves 7 of the outer joint member 2 and each of the balls 4 under a state in which each of the balls 4 is pressed against the track groove 9 of the inner joint member 3 (a gap at a groove bottom of the track groove 9 is not shown). As illustrated in FIG. 3, the PCD clearance Δ illustrated between the groove bottom of the track groove 7 and the ball 4 is formed in the contact angle α direction, but for convenience, a way of illustration therefor is partially modified.

The PCD (ToPCD) of the track grooves 7 of the outer joint member 2 is shaped to gradually become smaller from an opening side of a cup section 2a to the center portion C of the sliding range (center range W) and gradually become larger from the center portion C of the sliding range (center range W) to the deep side. A dimension of the above-mentioned fluctuation of the PCD that gradually fluctuates in the axial direction is from about 0.100 mm to about 0.300 mm.

The center portion C of the sliding range is described below. The center portion C of the sliding range is an axial position of a joint center O of the plunging-type constant velocity universal joint 1 after an assembly of the plunging-type constant velocity universal joint 1 is mounted to a vehicle, and is also the set position. As illustrated in FIG. 4, the double-offset plunging-type constant velocity universal joint 1 often comprises the stop ring 17 that is mounted to the opening-side end portion of the outer joint member 2 in order to prevent the inner assembly I comprising the inner joint member 3, the balls 4, and the cage 5 from falling out. The plunging-type constant velocity universal joint 1 is used in an area of the sliding range shown in FIG. 5 with the center portion C of the sliding range (set position) serving as a center. Specifically, as shown in FIG. 5, the ball 4 and the stop ring 17 (see FIG. 4) interfere with each other at a position on the line X1, and thus axial sliding on the opening side of the cup section 2a is restricted. Meanwhile, the cage 5 and a bottom of the cup section 2a interfere with each other at a position on the line X2, or a shaft (not shown) and an opening portion 2c of the cup section 2a (see FIG. 4) interfere with each other at a position on the line X3, and thus axial sliding on the deep side of the cup section 2a is restricted. As shown in FIG. 5, an amount of the axial sliding bounded by the lines X1 to X3 decreases as the operating angle increases.

Here, the center portion C of the sliding range is defined. The center portion C of the sliding range is set optionally depending on conditions of use of a vehicle. That is, the center portion C of the sliding range is displaced in some cases from an axial center position of a region that extends from the opening portion of the cup section 2a to the bottom of the cup section 2a and is bounded by the lines X1 to X3. Therefore, a center of axial displacement of the joint center O of the plunging-type constant velocity universal joint 1 during typical vehicle travel is defined as the center portion C of the sliding range. Based on the center portion C of the sliding range, the "center portion C of the sliding range ±10 mm" can cover an area that is always used during typical vehicle travel, and in this area, the PCD clearance Δ of the track grooves 7 and 9 and the PCD (ToPCD) of the track grooves 7 are defined. The center portion of the sliding range of the track groove of the outer joint member in the axial direction of the joint as used herein and in claims has the above-mentioned meaning.

Figure 6:
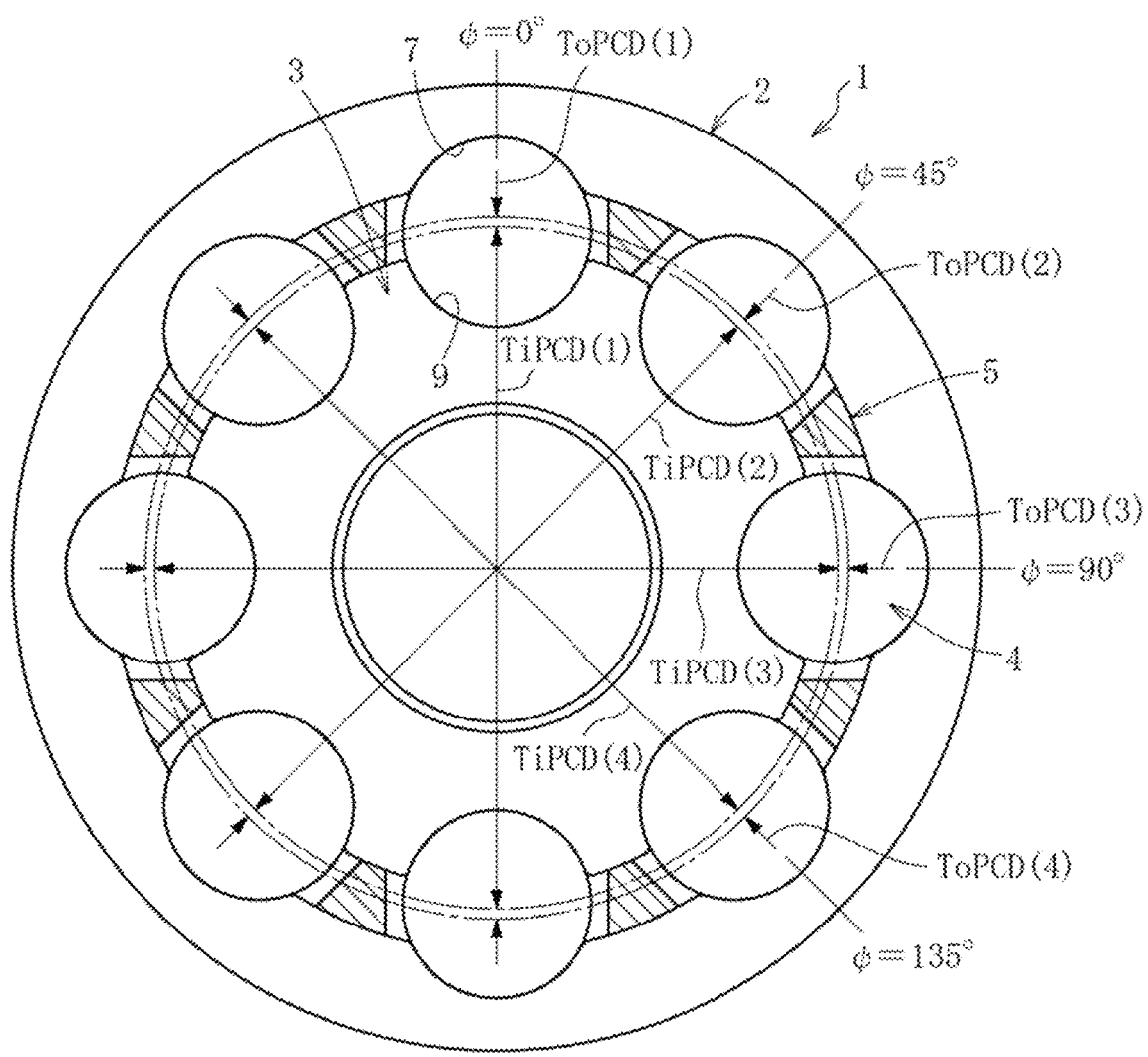
FIG. 6 is an explanatory transverse sectional view for illustrating variations in PCDs between track grooves of the plunging-type constant velocity universal joint according to this embodiment.
Figure 7:
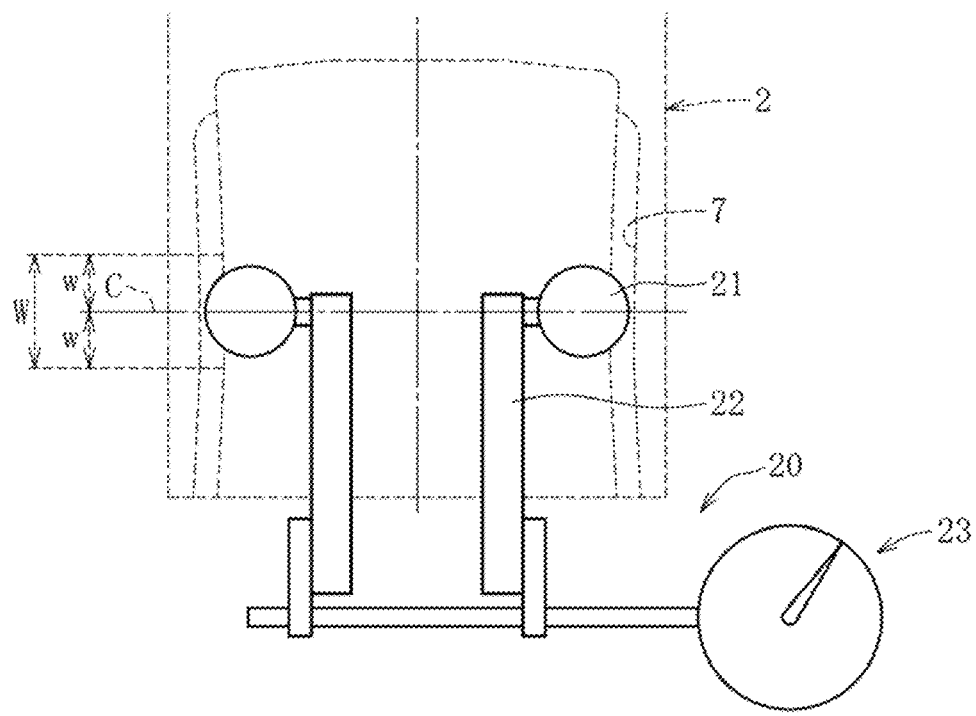
FIG. 7 is a schematic view of a measuring device for measuring a PCD mutual difference of track grooves of an outer joint member.
Figure 8:
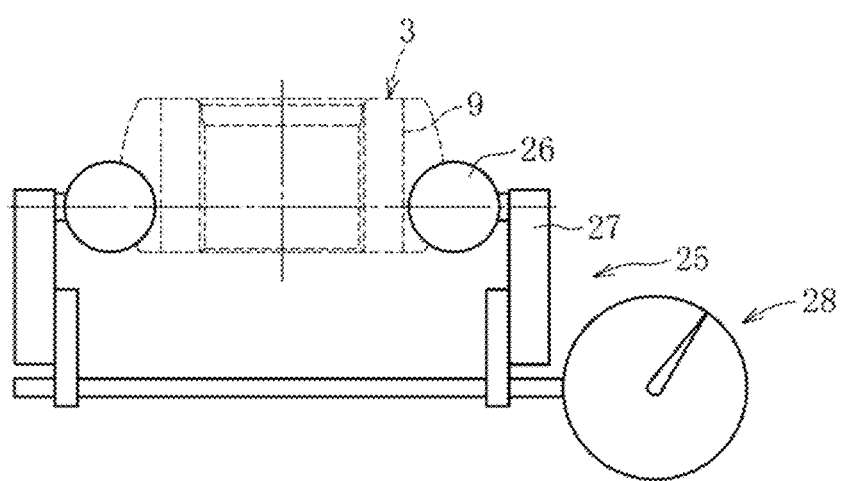
FIG. 8 is a schematic view of a measuring device for measuring a PCD mutual difference of track grooves of an inner joint member.

A condition of the PCDs of the track grooves 7 and 9 in the center range W in FIG. 4 and a method of measuring the PCD mutual difference are specifically described with reference to FIG. 6 to FIG. 8. FIG. 6 is an explanatory transverse sectional view for illustrating variations in PCDs of the track grooves of the plunging-type constant velocity universal joint according to this embodiment. FIG. 7 is a schematic view of a measuring device for measuring the PCD mutual difference of the track grooves of the outer joint member. FIG. 8 is a schematic view of a measuring device for measuring a PCD mutual difference of the track grooves of the inner joint member.

With reference to FIG. 7, the method of measuring the PCD mutual difference of the track grooves 7 of the outer joint member 2 in the center range W is described. As illustrated in FIG. 7, a measuring device 20 mainly comprises measuring balls 21 provided on a pair of arms 22, and a micrometer 23. Two measuring balls 21 are brought into abutment against the track grooves 7 of the outer joint member 2 to measure the PCD. All of ToPCD(1) to ToPCD (4) in FIG. 6 are measured, and the PCD mutual difference (ToPCD mutual difference) is measured from a difference between a maximum value and a minimum value of the micrometer 23.

With reference to FIG. 8, the method of measuring the PCD mutual difference of the track grooves 9 of the inner joint member 3 is described. As illustrated in FIG. 8, a measuring device 25 mainly comprises measuring balls 26 provided on a pair of arms 27, and a micrometer 28. Two measuring balls 26 are brought into abutment against the track grooves 9 of the outer joint member 3 to measure the PCD. All of TiPCD(1) to TiPCD(4) in FIG. 6 are measured, and the PCD mutual difference (TiPCD mutual difference) is measured from a difference between a maximum value and a minimum value of the micrometer 28.

As illustrated in FIG. 6, in the plunging-type constant velocity universal joint 1 according to this embodiment in which eight torque transmission balls 4 are incorporated, four PCDs of the track grooves 7 and four PCDs of the track grooves 9 are formed on a joint diameter. For the track grooves 7 of the outer joint member 2, the PCD with a phase angle φ=0° is represented by ToPCD(1), the PCD with a phase angle φ=45° is represented by ToPCD(2), the PCD with a phase angle q=90° is represented by ToPCD(3), and the PCD with a phase angle φ=135° is represented by ToPCD(4). For the track grooves 9 of the inner joint member 3, the PCD with a phase angle φ=0° is represented by TiPCD(1), the PCD with a phase angle φ=45° is represented by TiPCD(2), the PCD with a phase angle φ=90° is represented by TiPCD(3), and the PCD with a phase angle φ=135° is represented by TiPCD(4).

As described above, due to forging accuracy and heat treatment deformation, ToPCD(1) to ToPCD(4) of the track grooves 7 of the outer joint member 2 and TiPCD(1) to TiPCD(4) of the track grooves 9 of the inner joint member 3 vary. However, in FIG. 6, illustrations of respective variations of ToPCD(1) to ToPCD(4) and TiPCD(1) to TiPCD(4) are omitted. Here, a difference between a maximum value and a minimum value of the PCDs (ToPCDs) of all the track grooves 7 among ToPCD(1) to ToPCD(4) is defined as the PCD mutual difference of the track grooves 7 of the outer joint member 2. As used herein and in claims, the PCD mutual difference of the track grooves of the outer joint member has the above-mentioned meaning. Further, a difference between a maximum value and a minimum value among TiPCD(1) to TiPCD(4) is defined as the PCD mutual difference between the track grooves 9 of the inner joint member 3. As a result, the diameter $D_{BALL}$ of the ball 4 is a reference diameter (constant dimension), and hence there are variations in PCD clearance Δ. This embodiment has been attained by focusing on such technical problem.

The cup section 2a of the outer joint member 2 that accommodates the inner assembly I is tubular and has a relatively large diameter dimension, and hence the PCD mutual difference of the track grooves 7 formed on an inner surface of the cup section 2a tends to be severe. However, owing to recent development in production technology, the PCD mutual difference of the track grooves 7 of the outer joint member 2 has reached a level of 0.150 mm at the upper limit. In contrast, the inner joint member 3 has a relatively small diameter dimension, and the PCD mutual difference of the track grooves 9 formed on an outer surface of the inner joint member 3 can be reduced to from about 0.020 mm to about 0.030 mm. Thus, it has been found that a PCD rank tolerance range of the inner joint member 3, in which the balls 4 are incorporated in the track grooves 9, can be reduced to about 0.020 mm. As a result, the PCD rank tolerance range of the inner joint member 3 is extremely small as compared to a value of the PCD mutual difference of the track grooves 7 of the outer joint member 2, and hence it has been found that such a PCD rank tolerance range of the inner joint member 3 is suitable for handling selective combination. These findings have provided a clue to the solution.

The characteristic configuration (2) is that the minimum value of the PCD clearance Δ in the center range of the track groove is set to from 0.010 mm to 0.100 mm.

When a lower limit of the minimum value of the PCD clearance Δ of the track grooves is set to 0.010 mm or more, the ball 4 can slide smoothly in each of the track grooves 7 without unnecessary interference, thereby achieving good handleability owing to slide resistance at the time of mounting to a vehicle, and minimizing the PCD clearance Δ in the center range W of the sliding range most frequently used in actual vehicles. Thus, the circumferential backlash can be suppressed, and durability, strength, and NVH characteristics (low vibration characteristics) can be secured.

Further, when an upper limit of the minimum value of the PCD clearance Δ is set to 0.100 mm or less, a load can be borne in good balance between the track grooves 7 and 9 and the ball 4. Thus, durability, strength, and NVH characteristics (low vibration characteristics) can be secured.

In addition, when the minimum value of the PCD clearance Δ is set to 0.010 mm or more and 0.100 mm or less, selective combination of an inner joint member for the PCDs of the track grooves of the outer joint member is allowed in practical use. That is, a range of 0.090 mm is set between the lower limit value of 0.010 mm and the upper limit value of 0.100 mm for the minimum value of the PCD clearance Δ, and hence in practical use, there is allowed selective combination of, for example, the inner joint member 3 of an appropriate number rank having a PCD rank tolerance range of about 0.020 mm, in which the balls 4 are incorporated in the track grooves 9.

Specifically, description is made of a method of selectively combining the inner joint member 3, in which the balls 4 are incorporated in the track grooves 9, for the PCD of the track grooves 7 of the outer joint member 2. Before work of selective combination, the minimum value of the PCD of the track grooves 7 of the outer joint member 2 in the center range W and the maximum value of the PCD of the track grooves 9 of the inner joint member 3 are measured. As an example of a flow of the work of selective combination, a plurality of inner joint members 3 that have already been measured are stocked, and are compared with measurement data of the outer joint member 2 for which the minimum value of the PCD of the track grooves 7 in the center range W has been measured, thereby selectively combining the inner joint member 3 that satisfies the range (from 0.010 mm to 0.100 mm) of the minimum value of the PCD clearance Δ in the center range of the track groove.

Figure 9A:
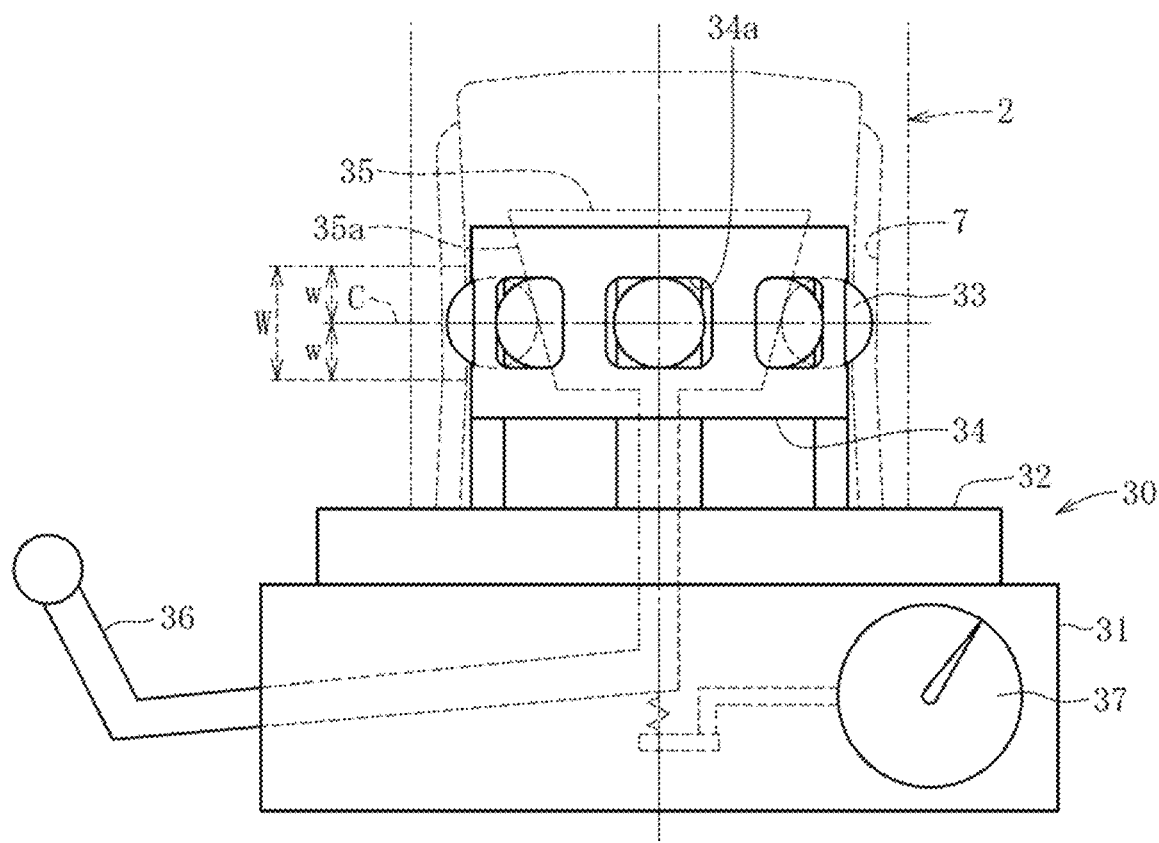
FIG. 9a is a schematic view of a measuring device for measuring a minimum value of a PCD of the track grooves of the outer joint member.
Figure 9B:
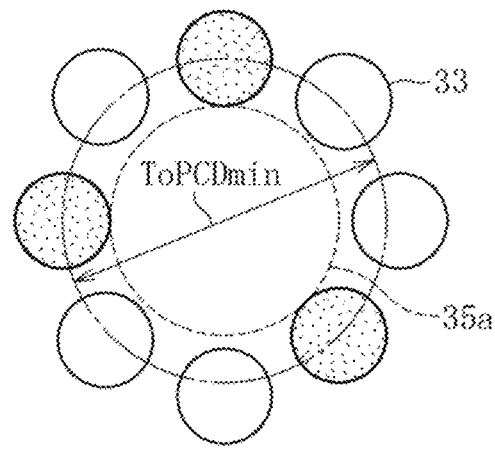
FIG. 9b is a view for illustrating a principle of measuring the minimum value of the PCD of the track grooves of the outer joint member.
Figure 10A:
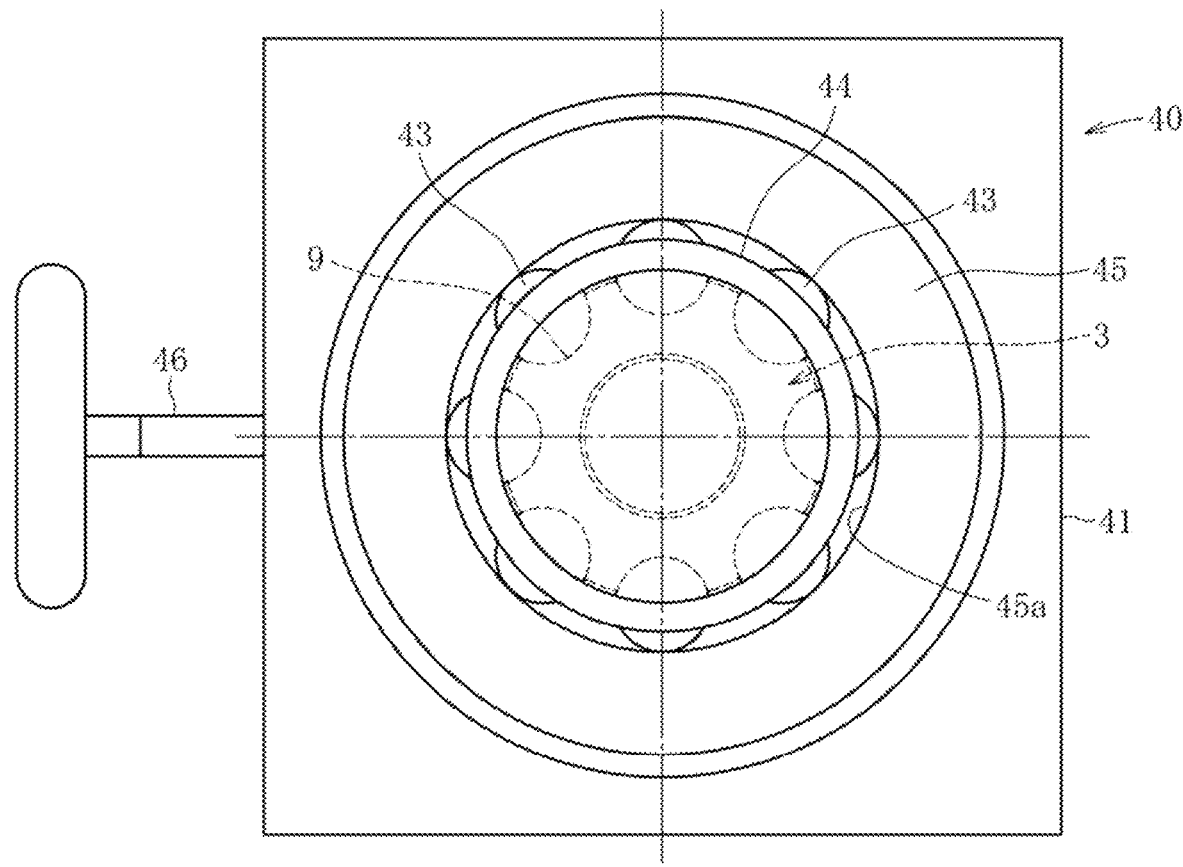
FIG. 10a is a schematic plan view of a measuring device for measuring a maximum value of a PCD of the track grooves of the inner joint member.
Figure 10B:
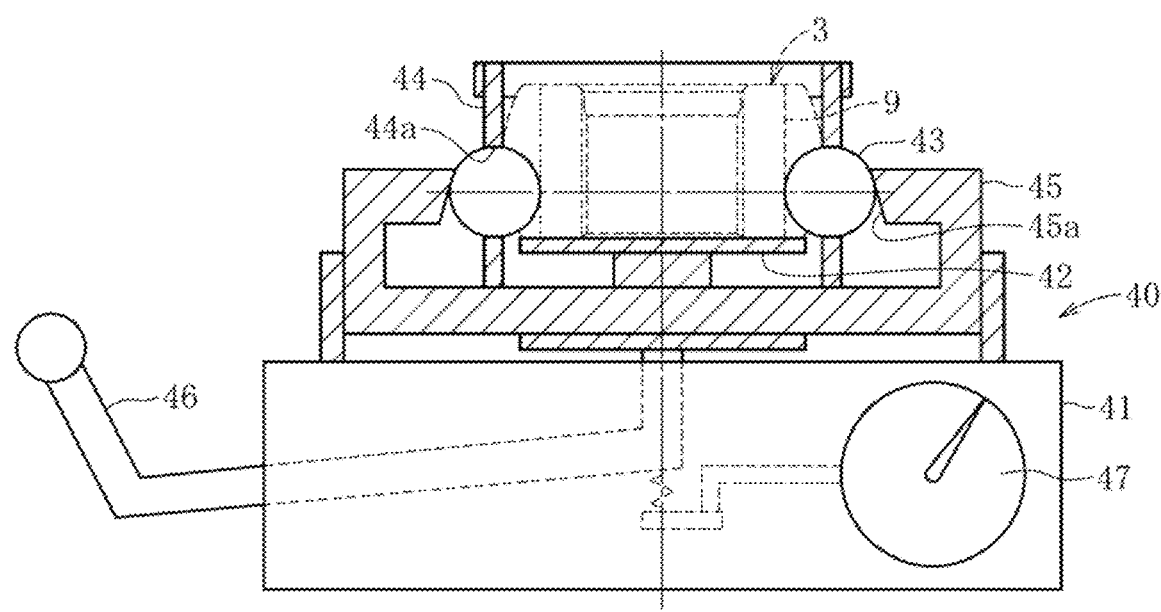
FIG. 10b is a front view for illustrating a schematic partial longitudinal section of the measuring device for measuring the maximum value of the PCD of the track grooves of the inner joint member.
Figure 11:
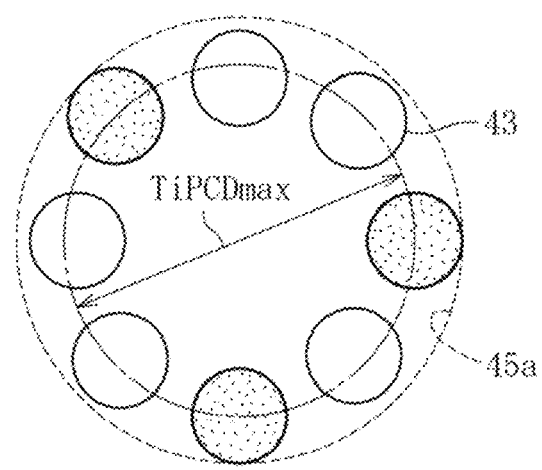
FIG. 11 is a view for illustrating a principle of measuring the maximum value of the PCD of the track grooves of the inner joint member.

A measurement method of measuring the minimum value of the PCD of the track grooves is described with reference to FIG. 9 to FIG. 11. FIG. 9a is a schematic view of a measuring device for measuring the minimum value of the PCD of the track grooves of the outer joint member in the center range W, and FIG. 9b is a view for illustrating a principle of measuring the minimum value of the PCD of the track grooves of the outer joint member. FIG. 10a is a plan view of a measuring device for measuring the maximum value of the PCD of the track grooves of the inner joint member, and FIG. 10b is a front view for illustrating a partial longitudinal section of the measuring device for measuring the maximum value of the PCD of the track grooves of the inner joint member. FIG. 11 is a view for illustrating a principle of measuring the maximum value of the PCD of the track grooves of the inner joint member.

As illustrated in FIG. 9a, a measuring device 30 for measuring the minimum value of the PCD of the track grooves 7 of the outer joint member 2 mainly comprises a base 31, a table 32, measuring balls 33, a ball holding section 34, a tapered shaft member 35, an operation lever 36, and a micrometer 37. The ball holding section 34 is fixed on the table 32, and accommodates the measuring balls 33 in pockets 34a so that the measuring balls 33 are movable in a radial direction and a circumferential direction. The tapered shaft member 35 comprises a conical outer peripheral surface 35a, and is arranged radially inward of an inscribed circle of the measuring balls 33 accommodated in the ball holding section 34. The tapered shaft member 35 is configured to be movable in an up-and-down direction (axial direction of the outer joint member 2) by the operation lever 36, and along with movement of the tapered shaft member 35 in the up-and-down direction, a circumscribed circle of the measuring balls 33 expands and contracts in the radial direction. An amount of the movement of the tapered shaft member 35 in the up-and-down direction is in conjunction with the micrometer 37.

The method of measuring the minimum value of the PCD of the track grooves 7 of the outer joint member 2 in the center range W is described. Under a state in which the circumscribed circle of the measuring balls 33 of the measuring device 30 contracts in the radial direction, the track grooves 7 of the outer joint member 2 are put in phase with the measuring balls 33, and the outer joint member 2 is placed on the table 32. As illustrated in FIG. 9a, the tapered shaft member 35 is moved downward to bring the conical outer peripheral surface 35a into abutment against the measuring balls 33 and press the measuring balls 33 against the track grooves 7. There are variations in PCDs of the track grooves 7, and hence as illustrated in the principle of measurement in FIG. 9b, among the eight measuring balls 33, three balls 33 indicated by the scattered dots are brought into abutment against the conical outer peripheral surface 35a of the tapered shaft member 35, to thereby measure the minimum value (ToPCDmin) of the PCD (ToPCD) of the track grooves 7 of the outer joint member 2.

As illustrated in FIG. 10a and FIG. 10b, a measuring device 40 for measuring the minimum value of the PCD of the track grooves 9 of the outer joint member 3 mainly comprises a base 41, a table 42, measuring balls 43, a ball holding section 44, a tapered hole member 45, an operation lever 46, and a micrometer 47. The ball holding section 44 is fixed on the base 41, and accommodates the measuring balls 43 in pockets 44a so that the measuring balls 43 are movable in a radial direction and a circumferential direction. The tapered hole member 45 comprises a conical inner peripheral surface 45a, and is arranged radially outward of a circumscribed circle of the measuring balls 43 accommodated in the ball holding section 44. The tapered hole member 45 is configured to be movable in an up-and-down direction (axial direction of the inner joint member 3) by the operation lever 46, and along with movement of the tapered hole member 45 in the up-and-down direction, an inscribed circle of the measuring balls 43 expands and contracts in the radial direction. An amount of the movement of the tapered hole member 45 in the up-and-down direction is in conjunction with the micrometer 47.

The method of measuring the maximum value of the PCD of the track grooves 9 of the inner joint member 3 is described. Under a state in which the inscribed circle of the measuring balls 43 of the measuring device 40 expands in the radial direction, the track grooves 9 of the inner joint member 3 are put in phase with the measuring balls 43, and the inner joint member 3 is placed on the table 42. As illustrated in FIG. 10a, the tapered hole member 45 is moved downward to bring the conical inner peripheral surface 45a into abutment against the measuring balls 43 and press the measuring balls 43 against the track grooves 9. There are variations in PCDs of the track grooves 9, and hence as illustrated in the principle of measurement in FIG. 11, among the eight measuring balls 43, three measuring balls 43 are brought into abutment against the conical inner peripheral surface 45a of the tapered hole member 45, to thereby measure the maximum value (TiPCDmax) of the PCD (TiPCD) of the track grooves 9 of the inner joint member 3.

A remainder obtained by subtracting the maximum value (TiPCDmax) of the PCD of the track grooves 9 of the inner joint member 3 and the mutual difference (TiPCD mutual difference) from the minimum value (ToPCDmin) of the PCD of the track grooves 7 of the outer joint member 2 is the minimum value of the PCD clearance Δ. That is, without considering phase alignment of a PCD minimum phase of the track grooves 7 of the outer joint member 2 and a PCD maximum phase of the track grooves 9 of the inner joint member 3, the minimum value Amin of the PCD clearance Δ in the center range W of the track groove 7 of the outer joint member 2 is expressed by the following equation.

Δmin=ToPCDmin−TiPCDmax−TiPCD mutual difference

The minimum value of the PCD clearance Δ in the center range W of the track groove of the outer joint member as used herein and in claims has the above-mentioned meaning.

The outer joint member 2 and the inner joint member 3 are selectively combined so that the outer joint member 2 and the inner joint member 3 satisfy that the minimum value Amin of the PCD clearance Δ measured by the above-mentioned method is from 0.010 mm to 0.100 mm, which is the minimum value of the PCD clearance Δ in the center range W.

Meanwhile, as a result of extensive studies and tests on the maximum value of the PCD clearance Δ in the center range W of the track groove of the outer joint member, it has been found that the maximum value of the PCD clearance Δ described above is 0.250 mm at the upper limit. It has been found that, when the maximum value of the PCD clearance Δ exceeds 0.250 mm, rattling noise or the like is generated under torque load and NVH characteristics (vibration characteristics) cannot be secured. The range of from 0.010 mm to 0.100 mm, which is the minimum value of the PCD clearance Δ in the center range W, has led to measures for securing the maximum value of the PCD clearance Δ within the upper limit of 0.250 mm in addition to practical conditions of the selective combination described above.

Specifically, the range of from 0.010 mm to 0.100 mm, which is the minimum value of the PCD clearance Δ in the center range W, is in a relationship that substantially fluctuates the upper limit value of 0.250 mm being the maximum value Amax of the PCD clearance Δ in the center range W. In order to secure the upper limit value of 0.250 mm, the upper limit value of 0.100 mm in the range of from 0.010 mm to 0.100 mm, which is the minimum value Amin of the PCD clearance Δ, is subtracted from the upper limit value of 0.250 mm, which is the maximum value Amax of the PCD clearance Δ, to obtain 0.150 mm, and it is required that the obtained value of 0.150 mm be set as the upper limit value of the PCD mutual difference of the track grooves 7 of the outer joint member 2 in the center range W. As a result, the following characteristic configuration (3) is derived.

The characteristic configuration (3) is that the PCD mutual difference of the track grooves of the outer joint member in the center range is set to 0.150 mm or less.

Apart from the above-mentioned measurement work to measure the minimum value of the PCD of the track grooves 7 of the outer joint member 2 in the center range W, all of ToPCD(1) to ToPCD(4) in FIG. 6 are measured using the measuring device 20 illustrated in FIG. 7. From a difference between a maximum value and a minimum value among ToPCD(1) to ToPCD(4), it is confirmed that the PCD mutual difference of the track grooves 7 of the outer joint member 2 in the center range W is 0.150 mm or less, and this outer joint member 2 is sent to a step for the selective combination. Further, it is noted that the PCD mutual difference in a region of each of the track grooves excluding the center range is set to 0.170 mm or less.

As described above, the PCD mutual difference of the track grooves of the outer joint member in the center range W is set to 0.150 mm or less, and hence the upper limit value of 0.250 mm for the maximum value Amax of the PCD clearance Δ can be secured under the condition that the minimum value Amin of the PCD clearance Δ is from 0.010 mm to 0.100 mm. The upper limit value of the maximum value Amax of the PCD clearance Δ in the center range W is set to 0.250 mm, and hence generation of rattling noise or the like under torque load can be suppressed.

To summarize the foregoing, the above-mentioned characteristic configurations (1) to (3) mutually work to enable practical use of selective combination of an inner joint member for PCD dimensions of track grooves of an outer joint member based on practical accuracy level of forging and heat treatment, can achieve good handleability owing to slide resistance at the time of mounting to a vehicle, and can suppress the circumferential backlash in the center range W of the sliding range most frequently used in actual vehicles. Thus, durability, strength, and NVH characteristics (low vibration characteristics) can be secured.

Figure 12:
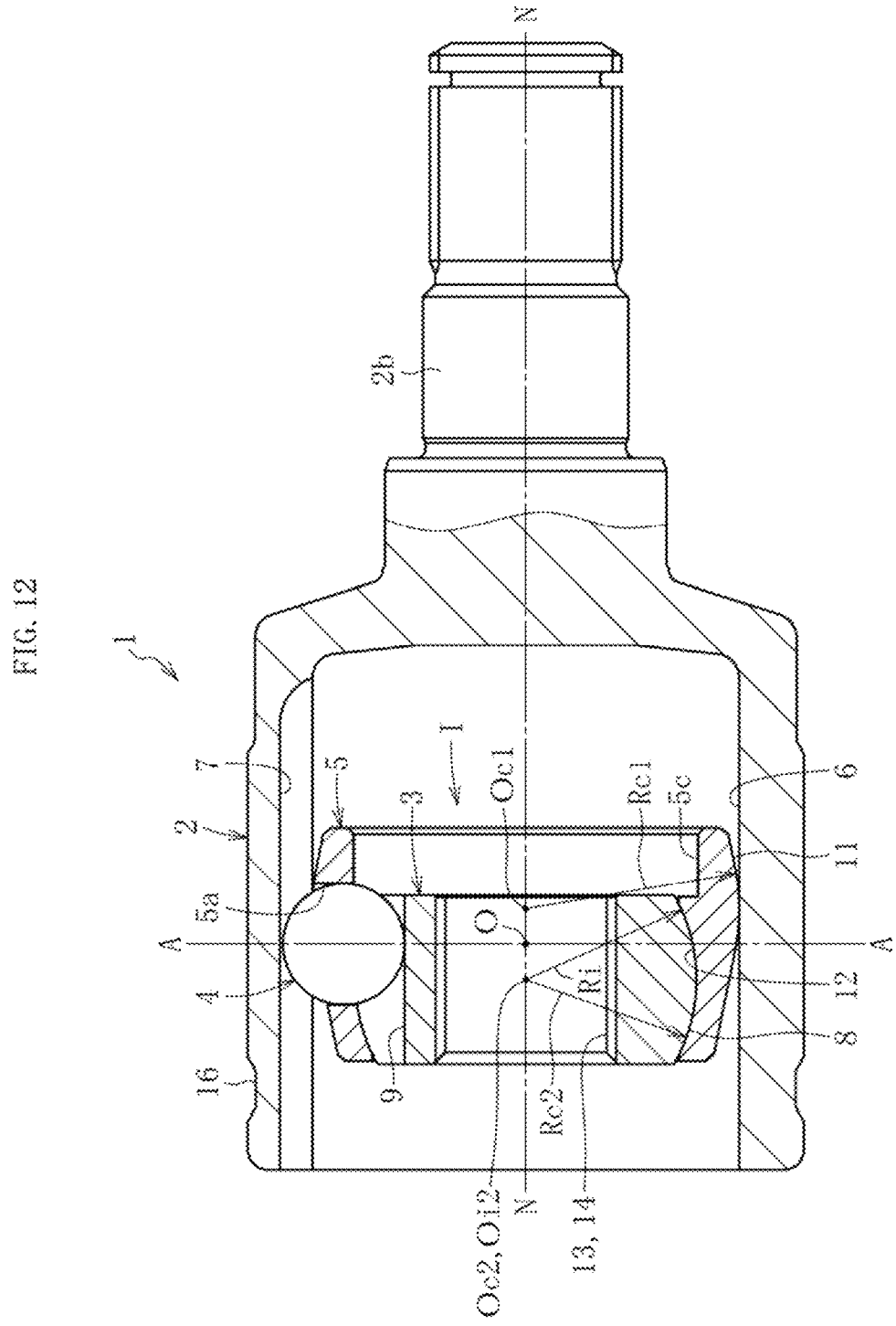
FIG. 12 is a longitudinal sectional view of a plunging-type constant velocity universal joint according to a second embodiment of the present invention, and is a longitudinal sectional view taken along the line B-N-B' of FIG. 13.
Figure 13:
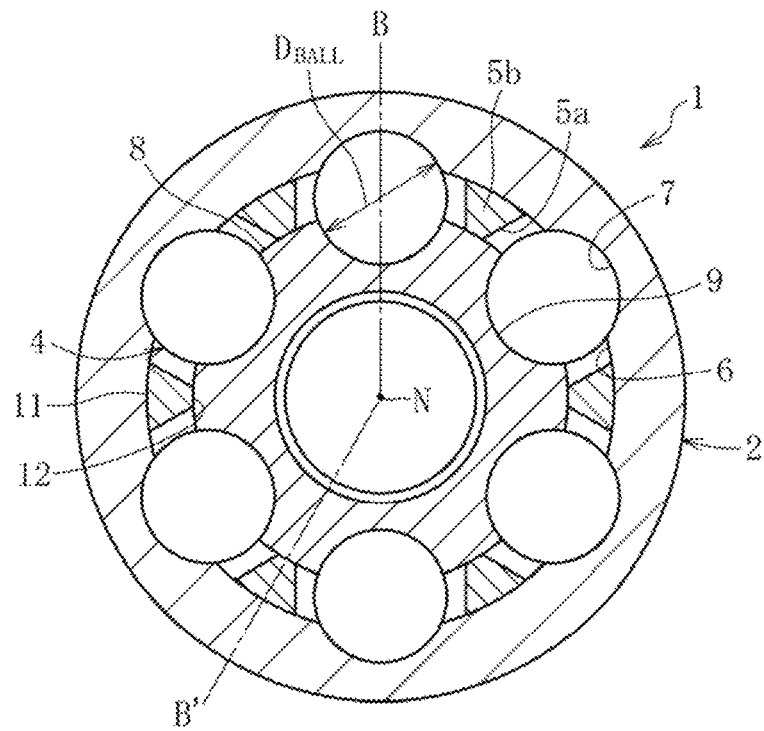
FIG. 13 is a transverse sectional view of the plunging-type constant velocity universal joint according to the second embodiment of the present invention, and is a transverse sectional view taken along the line A-A of FIG. 12.

A plunging-type constant velocity universal joint according to a second embodiment of the present invention is described with reference to FIG. 12 and FIG. 13. The double-offset plunging-type constant velocity universal joint according to this embodiment comprises six torque transmission balls, and differs from the plunging-type constant velocity universal joint according to the first embodiment in terms of the number of torque transmission balls. Other configurations are the same as those of the first embodiment. Thus, parts having similar functions are denoted by the same reference symbols, and only main points are described. FIG. 12 is a longitudinal sectional view of the plunging-type constant velocity universal joint according to this embodiment, and is a longitudinal sectional view taken along the line B-N-B' of FIG. 13. FIG. 13 is a transverse sectional view of the plunging-type constant velocity universal joint according to this embodiment, and is a transverse sectional view taken along the line A-A of FIG. 12.

As illustrated in FIG. 12 and FIG. 13, in the double-offset plunging-type constant velocity universal joint 1 according to this embodiment, the cylindrical inner peripheral surface 6 of the outer joint member 2 has six track grooves 7. The track grooves 7 are formed at equal intervals in the circumferential direction and linearly extend along the axial direction. The spherical outer peripheral surface 8 of the inner joint member 3 has track grooves 9 which are opposed to the track grooves 7 of the outer joint member 2. The track grooves 9 are formed at equal intervals in a circumferential direction and linearly extend along the axial direction. Six torque transmission balls (hereinafter simply referred to also as "balls") 4 are individually incorporated between the track grooves 7 of the outer joint member 2 and the track grooves 9 of the inner joint member 3.

The cage 5 comprises a spherical outer peripheral surface 11 and a spherical inner peripheral surface 12. The spherical outer peripheral surface 11 is fitted to and guided in contact with the cylindrical inner peripheral surface 6 of the outer joint member 2. The spherical inner peripheral surface 12 is fitted to and guided in contact with the spherical outer peripheral surface 8 of the inner joint member 3. The spherical outer peripheral surface 11 of the cage 5 is formed to have a curvature radius Rc1 about a curvature center represented by Oc1, and the spherical inner peripheral surface 12 is formed to have a curvature radius Rc2 about a curvature center represented by Oc2. The spherical outer peripheral surface 8 of the inner joint member 3 is formed to have a curvature radius Ri about the curvature center represented by Oi2. The curvature center Oi2 matches the curvature center Oc2. The curvature centers Oc1 and Oc2 are located on an axis N, and are offset by equal distances toward opposite sides in the axial direction with respect to a joint center O. With this configuration, when the joint forms an operating angle, the balls 4 are always guided on a plane bisecting an angle formed by both axes of the outer joint member 2 and the inner joint member 3, thereby achieving transmission between two shafts with constant-velocity rotation.

The double-offset plunging-type constant velocity universal joint 1 according to this embodiment also has the following characteristic configurations (1) to (3) similarly to the double-offset plunging-type constant velocity universal joint 1 according to the first embodiment described above.
(1) A range between a distance of 10 mm toward a deep side and a distance of 10 mm toward an opening side from a center portion of a sliding range of the track groove of the outer joint member in an axial direction of the joint is defined as a center range, and a region in which the PCD of the track grooves of the outer joint member becomes smallest is formed in the center range.
(2) A minimum value of the PCD clearance Δ in the track grooves in the center range is set to from 0.010 mm to 0.100 mm.
(3) A PCD mutual difference of the track grooves of the outer joint member in the center range is set to 0.150 mm or less.

The above-mentioned characteristic configurations (1) to (3) mutually work to enable practical use of selective combination of an inner joint member for PCD dimensions of track grooves of an outer joint member based on practical accuracy level of forging and heat treatment, can achieve good handleability owing to slide resistance at the time of mounting to a vehicle, and can suppress the circumferential backlash in the center range W of the sliding range most frequently used in actual vehicles. Thus, durability, strength, and NVH characteristics (low vibration characteristics) can be secured. The contents of description of the above-mentioned characteristic configurations (1) to (3) of the double-offset plunging-type constant velocity universal joint 1 according to the first embodiment are the same as those of the double-offset plunging-type constant velocity universal joint 1 according to this embodiment, and hence are applied correspondingly.

A first modification example of the inner assembly of the plunging-type constant velocity universal joint according to the second embodiment of the present invention is described with reference to FIG. 14. The inner assembly of this modification example differs from the second embodiment in that a positive axial clearance is formed between a pocket of a cage and a ball. Other configurations are the same as those of the second embodiment. Thus, parts having similar functions are denoted by the same reference symbols, and only main points are described.

Figure 14:
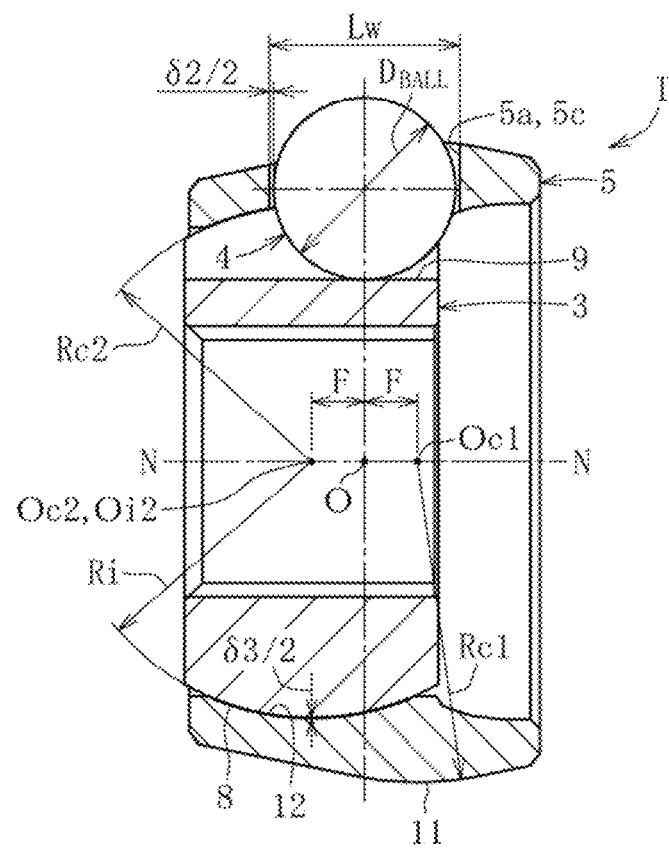
FIG. 14 is a longitudinal sectional view of a first modification example of an inner assembly of the plunging-type constant velocity universal joint according to the second embodiment of the present invention.

FIG. 14 is a longitudinal sectional view of the first modification example of the inner assembly of the plunging-type constant velocity universal joint according to the second embodiment. As illustrated in FIG. 14, the inner assembly I comprises the inner joint member 3, the cage 5, and the balls 4, and a positive axial clearance 82 is formed between wall surfaces 5c of the pocket 5a of the cage 5 opposed to each other in the axial direction of the joint and the torque transmission ball 4. When $D_{BALL}$ represents the diameter of the ball 4 and Lw represents a width between the wall surfaces 5c of the pocket 5a of the cage 5 opposed to each other in the axial direction of the joint, the axial clearance 82 is represented with $82=Lw-D_{BALL}$, and falls within a range of from about +0.001 mm to about +0.050 mm. With this configuration, the ball 4 can roll smoothly in the pocket 5a, thereby reducing the slide resistance.

A second modification example of the inner assembly of the plunging-type constant velocity universal joint according to the second embodiment of the present invention is described with reference to FIG. 15 and FIG. 16. The inner assembly of this modification example differs from the second embodiment in that a positive axial clearance is formed between a pocket of a cage and a ball, and an axial clearance that enables axial relative movement between an inner joint member and the cage is formed. Other configurations are the same as those of the second embodiment. Thus, parts having similar functions are denoted by the same reference symbols, and only main points are described.

Figure 15:
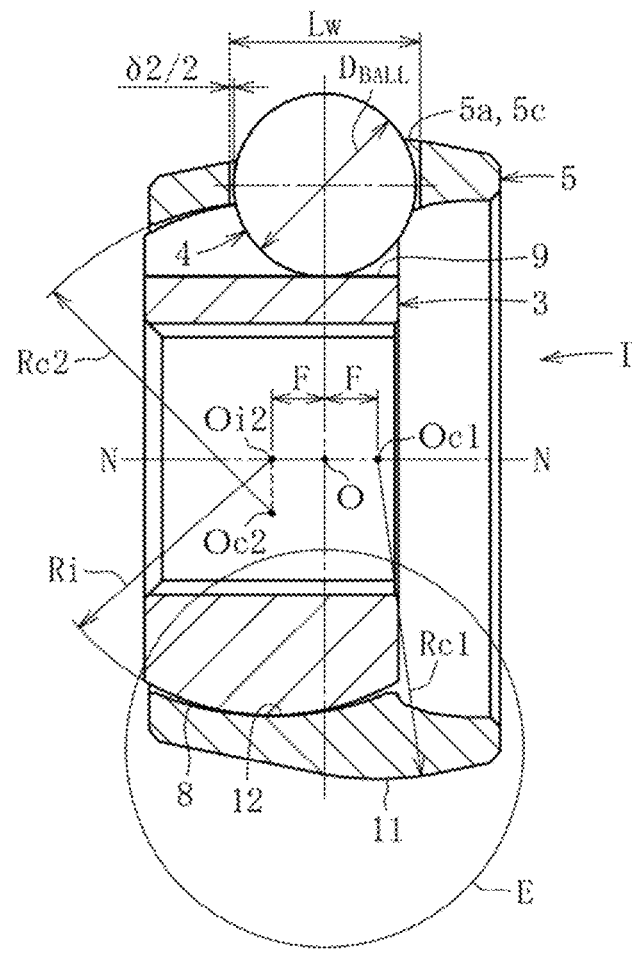
FIG. 15 is a longitudinal sectional view of a second modification example of the inner assembly of the plunging-type constant velocity universal joint according to the second embodiment of the present invention.
Figure 16:
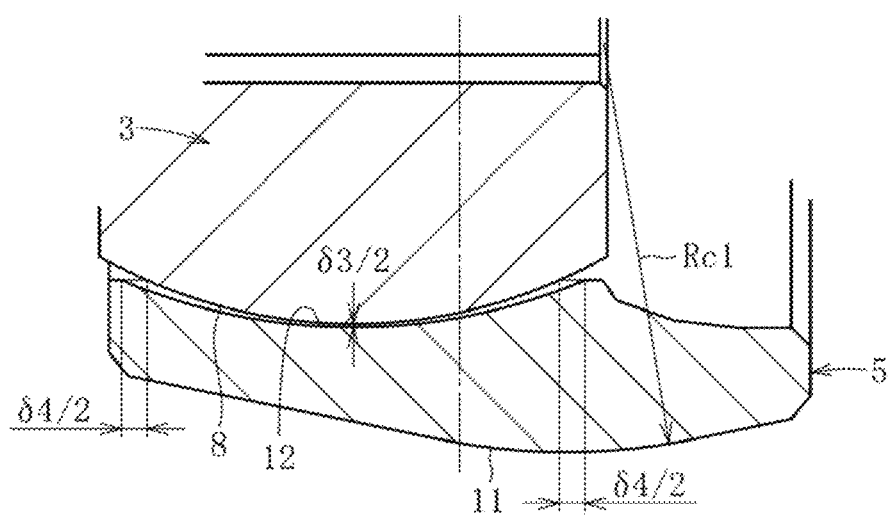
FIG. 16 is an enlarged view of a portion E of FIG. 15.

FIG. 15 is a longitudinal sectional view of the second modification example of the inner assembly of the plunging-type constant velocity universal joint according to the second embodiment, and FIG. 16 is an enlarged view of a portion E of FIG. 15. As illustrated in FIG. 15, the inner assembly I comprises the inner joint member 3, the cage 5, and the balls 4, and the positive axial clearance 82 is formed between the wall surfaces 5c of the pocket 5a of the cage 5 opposed to each other in the axial direction of the joint and the torque transmission ball 4. The spherical outer peripheral surface 11 of the cage 5 is formed to have the curvature radius Rc1 about a curvature center Oc1, and the spherical inner peripheral surface 12 is formed to have the curvature radius Rc2 about a curvature center Oc2. The spherical outer peripheral surface 8 of the inner joint member 3 is formed to have the curvature radius Ri about a curvature center Oi2. The curvature centers Oc1 and Oi2 are located on the axis N, and are offset by equal distances F in the axial direction with respect to the joint center O. Further, in order that Rc2>Ri is satisfied, the curvature center Oc2 of the spherical inner peripheral surface 12 of the cage 5 is located to be offset in the radial direction from the axis N with respect to the curvature center Oi2, and is offset by the distance F in the axial direction with respect to the joint center O.

As illustrated in FIG. 16, a spherical clearance 83 is formed at an axial center portion of the spherical outer peripheral surface 8 of the inner joint member 3 so as to allow guide in contact between the spherical outer peripheral surface 8 and the spherical inner peripheral surface 12 of the cage 5. On both sides of the center portion, an axial clearance 84 is formed so as to allow axial relative movement between the inner joint member 3 and the cage 5. The spherical clearance 83 is about 0.050 mm at a median value. The axial clearance 84 is about 1 mm. A movable amount of the inner joint member 3 with respect to the outer joint member 2 in the axial direction is about 2 mm which is twice as large as the axial clearance 84 of about 1 mm, and vibration is damped with the movable amount in the axial direction within this range. That is, slide resistance can be reduced for general-purpose vibration conditions. The spherical clearance 83 and the axial clearance 84 are illustrated in an exaggerated manner.

The axial clearance 84 between the cage 5 and the inner joint member 3, and the positive axial clearance 82 between the wall surfaces 5c of the pocket 5a of the cage 5 opposed to each other in the axial direction of the joint and the ball 4 mutually work, and thus can reduce the slide resistance.

A third modification example of the inner assembly of the plunging-type constant velocity universal joint according to the second embodiment of the present invention is described with reference to FIG. 17. The inner assembly of this modification example differs from the second modification example in a shape of a spherical inner peripheral surface of a cage. Other configurations are the same as those of the second embodiment and the second modification example. Thus, parts having similar functions are denoted by the same reference symbols, and only main points are described.

Figure 17:
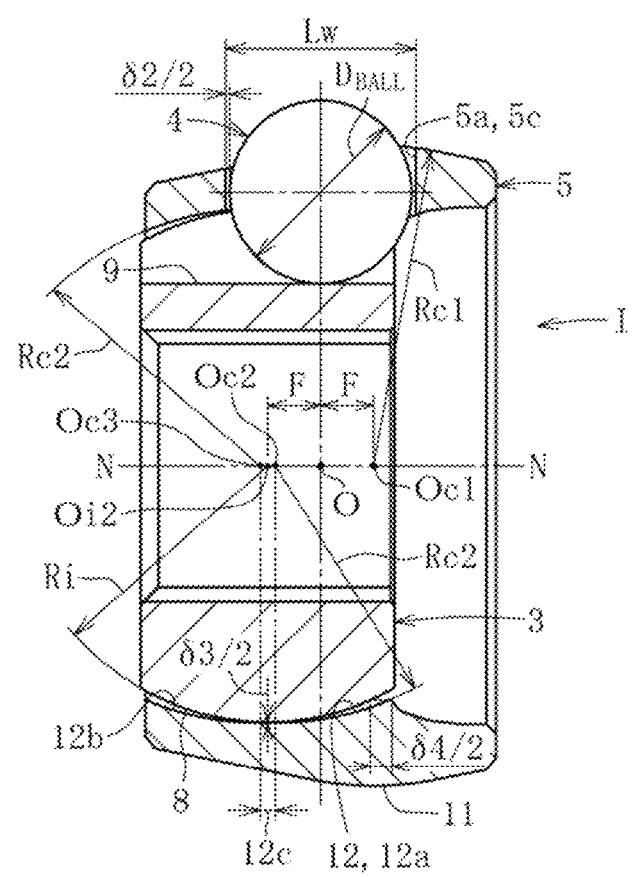
FIG. 17 is a longitudinal sectional view of a third modification example of the inner assembly of the plunging-type constant velocity universal joint according to the second embodiment of the present invention.

FIG. 17 is a longitudinal sectional view of a third modification example of the inner assembly of the plunging-type constant velocity universal joint according to the second embodiment. As illustrated in FIG. 17, the spherical inner peripheral surface 12 of the cage 5 comprises: a spherical portion 12a formed to have the curvature radius Rc2 about the curvature center Oc2; a spherical portion 12b formed to have the curvature radius Rc2 about a curvature center Oc3; and a cylindrical portion 12c tangentially connecting the spherical portion 12a and the spherical portion 12b together. The curvature center Oc2 and the curvature center Oc3 are located on the axis N, and an axial center point between the curvature center Oc2 and the curvature center Oc3 is offset by the distance F with respect to the joint center O. The spherical outer peripheral surface 8 of the inner joint member 3 is formed to have the curvature radius Ri about the curvature center Oi2. Under the arrangement state illustrated in FIG. 17, the axial center point between the curvature center Oc2 and the curvature center Oc3 of the spherical inner peripheral surface 12 of the cage 5 matches the curvature center Oi2 of the spherical outer peripheral surface 8 of the inner joint member 3.

A spherical clearance 83 is formed at an axial center portion of the spherical outer peripheral surface 8 of the inner joint member 3 so as to allow guide in contact between the spherical outer peripheral surface 8 and the cylindrical portion 12c of the cage 5. On both sides of the center portion, an axial clearance 84 is formed so as to allow axial relative movement between the inner joint member 3 and the cage 5. A length of the cylindrical portion 12c is about 1 mm, and the axial clearance 84 corresponds to the length of the cylindrical portion 12c. A movable amount of the inner joint member 3 with respect to the outer joint member 2 in the axial direction is about 2 mm which is twice as large as the length of the cylindrical portion 12c of about 1 mm, and vibration is damped with the movable amount in the axial direction within this range. That is, slide resistance can be reduced for general-purpose vibration conditions.

In this modification example, the spherical inner peripheral surface 12 of the cage 5 comprises: the spherical portion 12a formed to have the curvature radius Rc2 about the curvature center Oc2; the spherical portion 12b formed to have the curvature radius Rc2 about the curvature center Oc3; and the cylindrical portion 12c tangentially connecting the spherical portion 12a and the spherical portion 12b together. The curvature radius Rc2 and the curvature radius Ri are substantially the same, and hence guide in contact between the spherical inner peripheral surface 12 of the cage 5 and the spherical outer peripheral surface 8 of the inner joint member 3 is smooth and stable. Similarly to the first and second modification examples, the positive axial clearance δ2 is formed between the wall surfaces 5c of the pocket 5a of the cage 5 opposed to each other in the axial direction of the joint and the torque transmission ball 4.

The double-offset plunging-type constant velocity universal joint 1 including the inner assembly of each of the first to third modification examples also has the following characteristic configurations (1) to (3) similarly to the double-offset plunging-type constant velocity universal joint 1 according to the first embodiment described above.

(1) A range between a distance of 10 mm toward a deep side and a distance of 10 mm toward an opening side from a center portion of a sliding range of the track groove of the outer joint member in an axial direction of the joint is defined as a center range, and a region in which the PCD of the track grooves of the outer joint member becomes smallest is formed in the center range.

(2) A minimum value of the PCD clearance $\Delta$ in the track grooves in the center range is set to from 0.010 mm to 0.100 mm.

(3) A PCD mutual difference of the track grooves of the outer joint member in the center range is set to 0.150 mm or less.

The above-mentioned characteristic configurations (1) to (3) mutually work to enable practical use of selective combination of an inner joint member for PCD dimensions of track grooves of an outer joint member based on practical accuracy level of forging and heat treatment, can achieve good handleability owing to slide resistance at the time of mounting to a vehicle, and can suppress the circumferential backlash in the center range W of the sliding range most frequently used in actual vehicles. Thus, durability, strength, and NVH characteristics (low vibration characteristics) can be secured. The contents of description of the above-mentioned characteristic configurations (1) to (3) of the double-offset plunging-type constant velocity universal joint 1 according to the first embodiment are the same as those of the double-offset plunging-type constant velocity universal joint 1 according to this embodiment, and hence are applied correspondingly.

The first to third modification examples of the inner assembly I of the plunging-type constant t velocity universal joint according to the second embodiment can be applied to the double-offset plunging-type constant velocity universal joint 1 according to the first embodiment by changing the number of torque transmission balls 4 from six to eight.

The present invention is not limited to the above-mentioned embodiments and modification examples. As a matter of course, the present invention may be carried out in various modes without departing from the spirit of the present invention. The scope of the present invention is defined in claims, and encompasses equivalents described in claims and all changes within the scope of claims.

DESCRIPTION OF REFERENCE SIGNS 1 plunging-type constant velocity universal joint
2 outer joint member
3 inner joint member
4 torque transmission ball
5 cage
5a pocket
6 cylindrical inner peripheral surface
7 track groove
7a region in which PCD of track groove becomes smallest
8 spherical outer peripheral surface
9 track groove
11 spherical outer peripheral surface
12 spherical inner peripheral surface
C center portion of sliding range
$D_{BALL}$ ball diameter
F offset amount
O joint center
O1 curvature center
O2 curvature center
PCD pitch circle diameter
W center range
$\Delta$ PCD clearance
$\delta 2$ positive axial clearance between ball and pocket
$\delta 3$ spherical clearance
$\delta 4$ axial clearance between cage and inner joint member

The invention claimed is:

1. A plunging-type constant velocity universal joint, comprising:
an outer joint member comprising a cylindrical inner peripheral surface having a plurality of linear track grooves extending along an axial direction;
an inner joint member comprising a spherical outer peripheral surface having a plurality of linear track grooves which are opposed to the plurality of linear track grooves of the outer joint member, and extend along the axial direction;
a plurality of torque transmission balls incorporated between the plurality of linear track grooves of the outer joint member and the plurality of linear track grooves of the inner joint member; and
a cage, which is configured to accommodate the torque transmission balls in pockets, and comprises a spherical outer peripheral surface and a spherical inner peripheral surface, which are guided in contact with the cylindrical inner peripheral surface of the outer joint member and the spherical outer peripheral surface of the inner joint member, respectively,
a curvature center of the spherical outer peripheral surface of the cage and a curvature center of the spherical inner peripheral surface of the cage being offset toward opposite sides in the axial direction with respect to a joint center,
wherein a range between a distance of 10 mm toward a deep side and a distance of 10 mm toward an opening side from a center portion of a sliding range of the track groove of the outer joint member in the axial direction of the joint is defined as a center range, and a region in which a PCD of the track grooves of the outer joint member becomes smallest is formed in the center range,
wherein a minimum value of a PCD clearance in the track grooves in the center range is set to from 0.010 mm to 0.100 mm, and
wherein a PCD mutual difference of the track grooves of the outer joint member in the center range is set to 0.150 mm or less.

2. The plunging-type constant velocity universal joint according to claim 1, wherein the PCD mutual difference in a region of each of the track grooves excluding the center range is set to 0.170 mm or less.

3. The plunging-type constant velocity universal joint according to claim 1, wherein the track grooves are each a surface formed by plastic working.

4. The plunging-type constant velocity universal joint according to claim 1, wherein the torque transmission ball is held in angular contact with each of the track groove of the outer joint member and the track groove of the inner joint member.

5. The plunging-type constant velocity universal joint according to claim 1, wherein the number of the plurality of torque transmission balls is set within a range of from six to eight.

* * * * *